United States Patent
Tsai et al.

(10) Patent No.: US 9,454,273 B2
(45) Date of Patent: Sep. 27, 2016

(54) TOUCH PANEL WITH NARROW BORDER

(71) Applicant: HANNSTOUCH SOLUTION INCORPORATED, Tainan (TW)

(72) Inventors: Ching-Feng Tsai, New Taipei (TW); Hsin-Cheng Chen, New Taipei (TW)

(73) Assignee: HannsTouch Solution Incorporated, Tainan (TW)

( * ) Notice: Subject to any disclaimer, the term of this patent is extended or adjusted under 35 U.S.C. 154(b) by 113 days.

(21) Appl. No.: 14/303,561

(22) Filed: Jun. 12, 2014

(65) Prior Publication Data

US 2015/0241906 A1    Aug. 27, 2015

(30) Foreign Application Priority Data

Feb. 24, 2014   (TW) .............................. 103203145 U

(51) Int. Cl.
G06F 3/041     (2006.01)
G06F 3/044     (2006.01)

(52) U.S. Cl.
CPC .................................... *G06F 3/044* (2013.01)

(58) Field of Classification Search
CPC ...... G06F 3/041; G06F 3/045; G06F 3/0416; G09G 3/30; G09G 3/32; G06K 11/06; G08C 21/00
See application file for complete search history.

(56) References Cited

U.S. PATENT DOCUMENTS

| | | | | |
|---|---|---|---|---|
| 2010/0110041 A1* | 5/2010 | Jang | ..................... | G06F 3/0412 345/174 |
| 2012/0182250 A1* | 7/2012 | Nagata | ..................... | G06F 3/044 345/173 |
| 2012/0319967 A1* | 12/2012 | Tsai | ..................... | G06F 1/1626 345/173 |
| 2013/0141664 A1* | 6/2013 | Toyoyama | ............ | G02F 1/1333 349/59 |
| 2014/0192309 A1* | 7/2014 | Nakagawa | .......... | G02F 1/13452 349/150 |

* cited by examiner

*Primary Examiner* — Pegeman Karimi
(74) *Attorney, Agent, or Firm* — Winston Hsu; Scott Margo

(57) ABSTRACT

A touch panel includes a substrate, a flexible printed circuit board and a sensing device. The substrate includes a main plane having an active region and a non-active region surrounding the active region. The flexible printed circuit board has a bonding surface, wherein the bonding surface and the main plane are not parallel to each other. The sensing device includes a plurality of electrode patterns located in the active region and a plurality of connecting lines respectively connected between the electrode patterns and the flexible printed circuit board so as to electrically connect the electrode patterns and the flexible printed circuit board, wherein at least a part of the connecting lines is located in the non-active region, and the connecting lines are connected to the bonding surface of the flexible printed circuit board.

14 Claims, 11 Drawing Sheets

TOUCH PANEL WITH NARROW BORDER

CROSS-REFERENCE TO RELATED APPLICATION

This application claims the priority benefit of Taiwan application serial no. 103203145, filed on Feb. 24, 2014. The entirety of the above-mentioned patent application is hereby incorporated by reference herein and made a part of this specification.

BACKGROUND

1. Field of the Utility Model

The present invention generally relates to a panel, and particularly, to a touch panel.

2. Description Of Related Art

In the society today, many information products have changed the traditional input device such as keyboard or mouse to a touch panel as the input device thereof.

A conventional touch panel makes the sensing device thereof disposed on the surface of a substrate, followed by adhering a flexible printed circuit board onto the surface so as to electrically connect the sensing device. In this way, the signal of the sensing device is transmitted to other components via the flexible printed circuit board. On the other hand, a conventional touch panel makes the circuit of the sensing device at the peripheral area of the surface and uses a shielding layer to shield the peripheral circuit. At the time, the shielding layer also shields the bonding region on the surface of the flexible printed circuit board and the sensing device.

However, the aforementioned bonding region may expand the range of the shielding layer to affect the border dimension of the sensing device so that the border dimension of the sensing device is unable to be effectively reduced.

SUMMARY OF THE DISCLOSURE

Accordingly, the present invention is directed to a touch panel with narrow border.

A touch panel of the invention includes a substrate, a flexible printed circuit board and a sensing device. The substrate includes a main plane having an active region and a non-active region surrounding the active region. The flexible printed circuit board has a bonding surface, wherein the bonding surface and the main plane are not parallel to each other. The sensing device includes a plurality of electrode patterns located in the active region and a plurality of connecting lines respectively connected between the electrode patterns and the flexible printed circuit board so as to electrically connect the electrode patterns and the flexible printed circuit board, wherein at least a part of the connecting lines is located in the non-active region, and the connecting lines are connected to the bonding surface of the flexible printed circuit board.

In an embodiment of the invention, the touch panel further includes a flexible transparent film having a first region and a second region so that the first region is connected to the main plane and the second region is connected to the bonding surface after folding the flexible transparent film. Each of the connecting lines includes a first portion and a second portion connected to each other, the first portion is disposed on the main plane of the substrate, the second portion is disposed on the flexible transparent film and extends to the second region from the first region, and the second portion connects the first portion at the first region and connects the flexible printed circuit board at the second region.

Based on the depiction above, in the touch panel of the invention, the connection lines of the sensing device are bonded to the bonding surface of the flexible printed circuit board, in which the normal direction of the bonding surface intersects the normal direction of the main plane to make the bonding region of the sensing device and the flexible printed circuit board not located on the main plane. In this way, the disposition range of the shielding layer can be reduced so as to effectively reduce the border dimension and achieve a narrow border effect.

Other objectives, features and advantages of the invention will be further understood from the further technological features disclosed by the embodiments of the invention wherein there are shown and described preferred embodiments of this invention, simply by way of illustration of modes best suited to carry out the invention.

DESCRIPTION OF THE EMBODIMENTS

Figure 1:
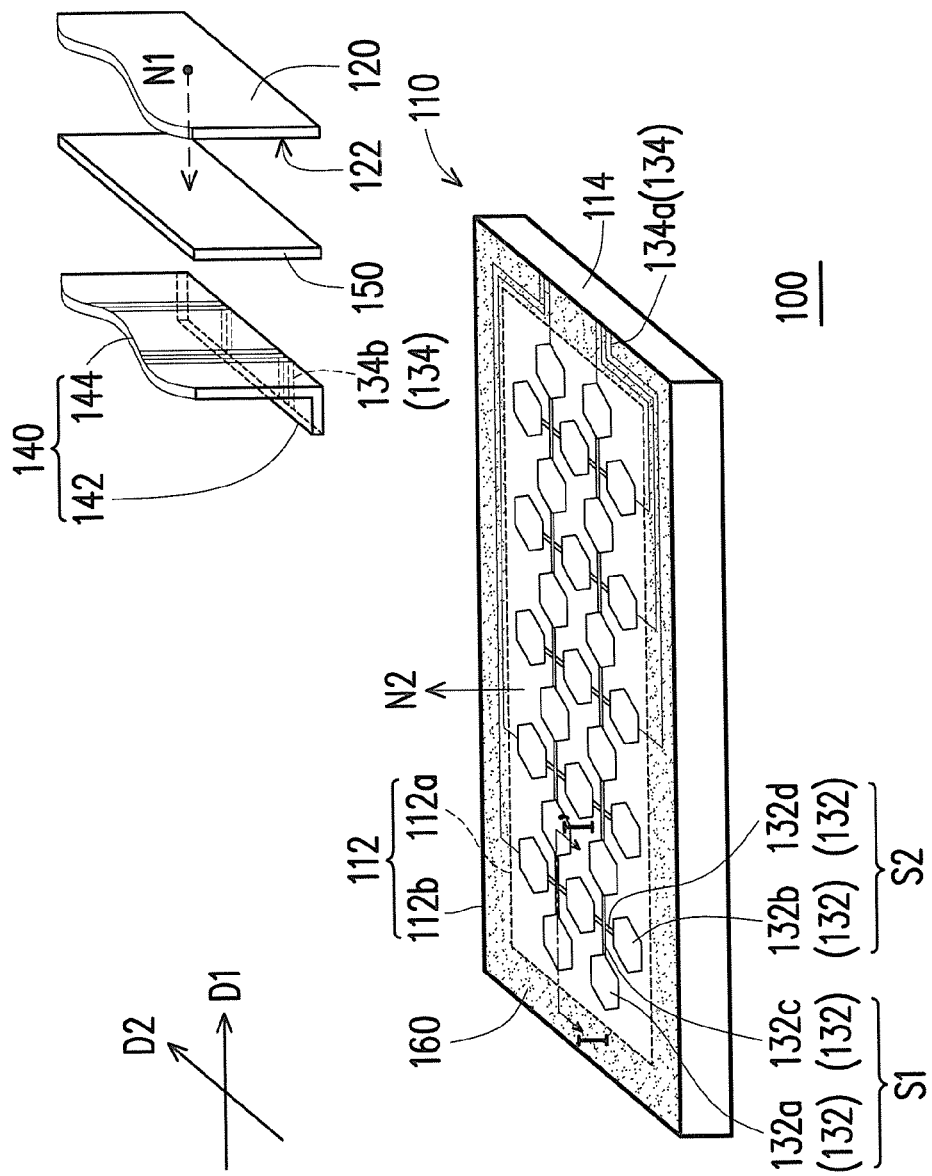
FIG. 1 is a partial exploded diagram of a touch panel according to an embodiment of the invention.
Figure 2:
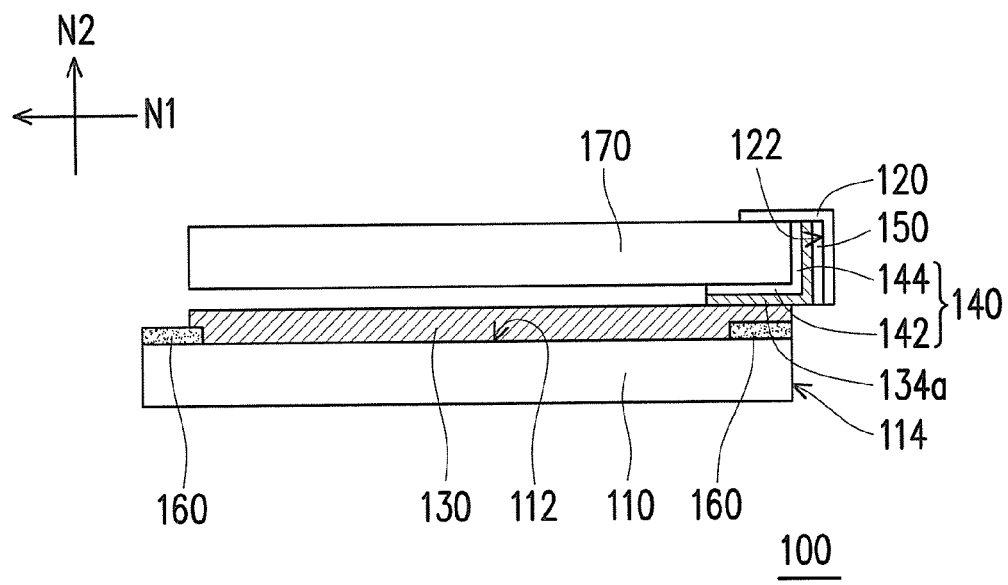
FIG. 2 is a cross-sectional diagram of the touch panel of FIG. 1.

FIG. 1 is a partial exploded diagram of a touch panel according to an embodiment of the invention and FIG. 2 is a cross-sectional diagram of the touch panel of FIG. 1. Referring to FIGS. 1 and 2, a touch panel 100 includes a substrate 110, a flexible printed circuit board 120, a sensing device 130 and a shielding layer 160. The touch panel 100 can be disposed on a display module 170. The substrate 110 is, for example, glass substrate or other substrates with transparent material. The substrate 110 includes a main plane 112, and the main plane 112 has an active region 112a and a non-active region 112b surrounding the active region 112a. The flexible printed circuit board 120 has a bonding surface 122, in which the bonding surface 122 and the main plane 112 are not parallel to each other. In the embodiment, both the bonding surface 122 and the main plane 112 are planes, and the normal direction N1 of the bonding surface 122 intersects the normal direction N1 of the main plane 112. In the embodiment, the normal direction N1 of the bonding surface 122 is, for example, perpendicular to the normal direction N1 of the main plane 112, but in other embodiments, the included angle between the normal direction N1 and the normal direction N2 can be any angle greater than zero. In addition, in other embodiments, the bonding surface 122 can be curved surface. For example, when the flexible printed circuit board 120 is not adhered onto other planes, the bonding surface 122 can be any curved surface and is not parallel to the main plane 112.

The sensing device 130 includes a plurality of electrode patterns 132 and a plurality of connecting lines 134 for realizing the touch sensing function of the touch panel 100. The electrode patterns 132 are located in the active region 112a, the connecting lines 134 extend from the active region 112a to the non-active region 112b to make at least the partial connecting lines 134 located in the non-active region 112b. The shielding layer 160 is disposed at the non-active region 112b to shield the connecting lines 134 at the non-active region 112b. The material of the shielding layer 160 can be ink, photoresist material or ceramic material. The color of the shielding layer 160 can be, for example, black, white or other colors. The connecting lines 134 are respectively connected between the electrode patterns 132 and the flexible printed circuit board 120 so as to be electrically connected the electrode patterns 132 and the flexible printed circuit board 120. In this way, the signal of the sensing device 130 can be transmitted to the flexible printed circuit board 120.

The touch panel 100 of the embodiment can be a capacitive touch panel, where when the user's touching position is located in the active region 112a, for example, when the finger of the user touches where the electrode patterns 132 are, the capacitance variation of the electrode patterns 132 can be used to determined the touching position of the user. On contrary, when the user's touching position is located in where the non-active region 112b is, for example, when the finger of the user touches the connecting lines 134 of the non-active region 112b, it indicates a void touching. In short, the active region and the non-active region in the embodiment indicate whether or not a user's touching on the region is an effective touching.

Figure 3:
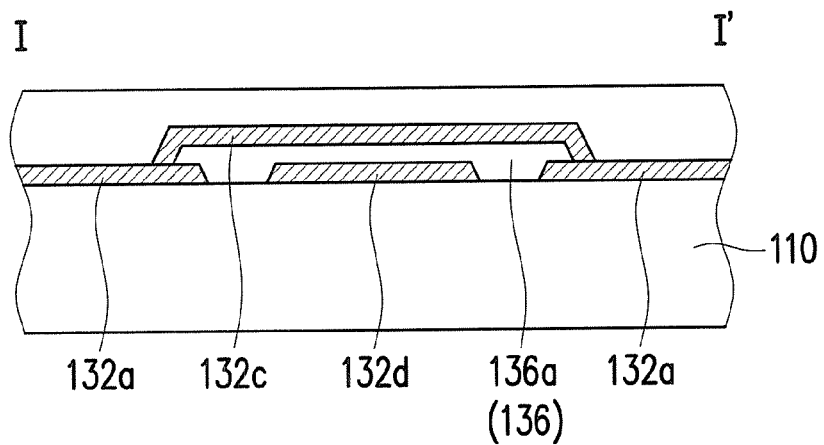
FIG. 3 is a cross-sectional diagram along line I-I' of FIG. 1.

FIG. 3 is a cross-sectional diagram of FIG. 1 along line I-I'. Referring to FIGS. 1 and 3, in more details, in the sensing device 130 of the embodiment, the electrode patterns 132 include a plurality of first electrode portions 132a, a plurality of second electrode portions 132b, a plurality of first connection portions 132c and a plurality of second connection portions 132d. The first connection portions 132c are connected to the first electrode portions 132a along a first direction D1 to form a plurality of first electrode strings S1; the second connection portions 132d are connected to the second electrode portions 132b along a second direction D2 to form a plurality of second electrode strings S2. There is an insulation layer 136 between the first connection portions 132c and the second connection portions 132d to make the first electrode strings S1 and the second electrode strings S2 insulated from each other.

In the embodiment, the insulation layer 136 includes a plurality of insulation structures 136a (only one is shown in the figure), which are correspondingly disposed between the first connection portions 132c and the second connection portions 132d. In other embodiments, the insulation layer 136 can almost entirely overlay the substrate 110 and include a plurality of via holes. The via holes herein are correspondingly disposed at the ends of the first connection portions 132c, while each of the first connection portions 132c is electrically connected to two adjacent first electrode portions 132a through a via hole. The connecting lines 134 are respectively connected to the first electrode strings S1 and the second electrode strings S2. The first direction D1 intersects the second direction D2. In the embodiment, the first direction D1 and the second direction D2 are, for example, on the main plane 112 and perpendicular to each other.

Figure 4:
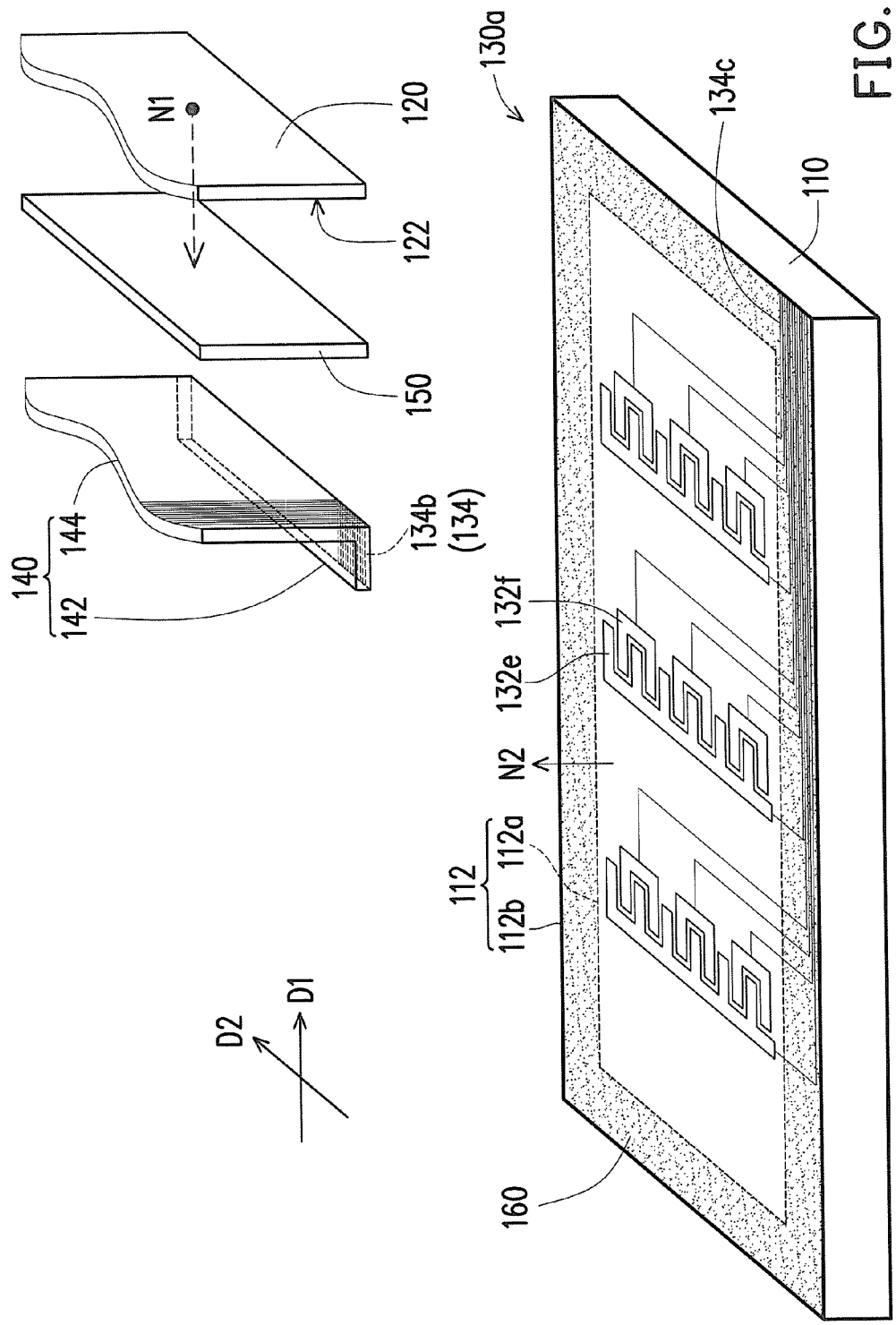
FIG. 4 is a partial exploded diagram of a touch panel according to another embodiment of the invention.

It should be noted that the sensing device 130 in electrode string form is an example only, which the invention is not limited to. One skilled in the art can use other forms of the sensing device 130 for realizing the touch sensing function of the touch panel 100. For example, the design embodiment of the invention can be extendedly used for a touch panel wherein the sensing device is an one-layer electrode sensor (or single layer electrode sensor). As shown by FIG. 4, the sensing device 130a includes an one-layer electrode sensor formed on the substrate 110, in which the one layer electrode sensor has a plurality of driving electrodes 132e, a plurality of scan electrodes 132f and a plurality of connection lines 134c.

Referring back to FIGS. 1 and 2, the connecting lines 134 are connected to the bonding surface 122 of the flexible printed circuit board 120, and the bonding surface 122 and the main plane 112 are not parallel to each other to make the bonding region between the connecting lines 134 and the flexible printed circuit board 120 not located on the main plane 112 of the substrate 110, i.e., the bonding surface 122 of the flexible printed circuit board 120 and the main plane 112 of the substrate 110 are not overlapped with and adhered to each other. In this way, the main plane 112 of the substrate 110 does not need an additional space serving as the bonding region of the connecting lines 134 and the flexible printed circuit board 120, which further reduces the area range of the shielding layer 160, effectively reduces the border dimension of the touch panel 100 to make the touch panel 100 have narrow border advantage.

In the embodiment, the touch panel 100 further includes a flexible transparent film 140. The flexible transparent film 140 is connected to the main plane 112 and the bonding surface 122 through an adhesive 150, for example, a conductive glue. The flexible transparent film 140, through folding, has a first region 142 and a second region 144. The first region 142 is connected to the main plane 112 and the second region 144 is connected to the bonding surface 122. In the embodiment, the bonding surface 122 of the flexible printed circuit board 120 and the side surface 114 of the substrate 110 are located at the upper and bottom sides of the main plane 112 so that the second region 144 gets folded towards the direction far away from the substrate 110. Each of the connecting lines 134 includes a first portion 134a and a second portion 134b connected to each other. The first portion 134a is disposed on the main plane 112 of the substrate 110, and the second portion 134b is disposed on the flexible transparent film 140 and extends from the first region 142 to the second region 144. The second portion 134b connects the first portion 134a at the intersection place of the first region 142 and the second region 144 and connects the flexible printed circuit board 120 at the second region 144. That is, in the embodiment, each of the connecting lines 134 are not an one-body formed linear structure, but is formed by connecting the linear conductor structures on the substrate 110 and the flexible transparent film 140 so as to define a conductor structure of a continuous conductive path.

In the embodiment, the flexible transparent film 140 and the second portion 134b thereon are used to electrically connecting the connecting lines 134 to the flexible printed circuit board 120 at the bonding surface 122. Specifically, by means of foldable property of the flexible transparent film 140, the folded flexible transparent film 140 in the embodiment can connect to two planes not on a same horizontal plane, i.e., connect to the main plane 112 and the bonding surface 122 that are not parallel to each other. Then, the second portion 134b disposed on the flexible transparent film 140 is used to be respectively electrically connected to the parts on the main plane 112 and the bonding surface 122. On the other hand, the flexible transparent film 140 has good transparency, so that if the connecting lines 134 are made of material with good transparency such as indium tin oxide (ITO), the touch panel 100 can further omit the shielding layer 160 to make the entire main plane 112 as a transparent region and achieve a zero-border design.

The display module 170 provides the touch panel 100 with display function. In the embodiment, the flexible printed circuit board 120 can be optionally connected to the display module 170 so that the sensing device 130 is electrically connected to the display module 170 via the flexible printed circuit board 120, but the invention does not limit the electrically connection way between the sensing device 130 and the display module 170. In the embodiment, although FIG. 2 illustrates the shielding layer 160 disposed on the substrate 110, in other embodiments, the shielding layer 160 can be optionally disposed on a covering plate (not shown), in which the covering plate is disposed on the substrate 110. In other words, the sensing device 130 can be located between the covering plate and the substrate 110, and the shielding layer 160 on the covering plate faces the sensing device 130, i.e., the covering plate 180 is located at the outmost side of the whole touch panel 100 to protect the parts therein. The covering plate is, for example, a glass cover plate or other cover plates with transparent material. Thus, the substrate 110 can be a flexible substrate, for example, a plastic substrate, which the invention is not limited to. As shown by FIG. 1, if the substrate 110 has sufficient mechanical strength to protect the sensing device 130 and other parts, no need to employ the covering plate for the touch panel 100. In addition, in the figures depicted in the embodiment, the thicknesses and the dimensions of all the parts are illustrated for representing the layout diagram thereof, not necessarily corresponding to the actual sizes in the application.

Figure 5:
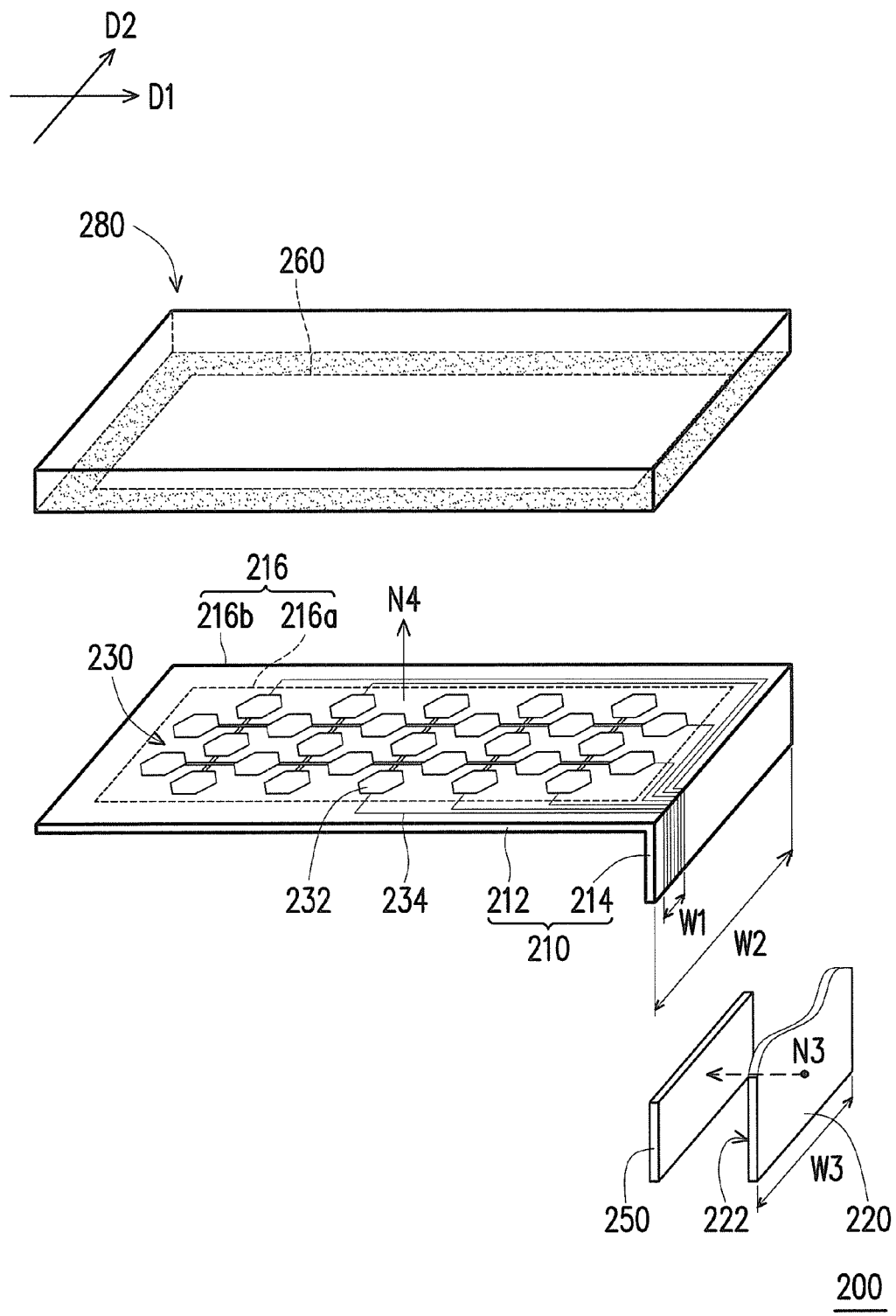
FIG. 5 is a partial exploded diagram of a touch panel according to yet another embodiment of the invention.
Figure 6:
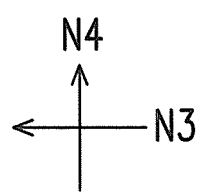
FIG. 6 is a cross-sectional diagram of the touch panel of FIG. 5.
Figure 6:
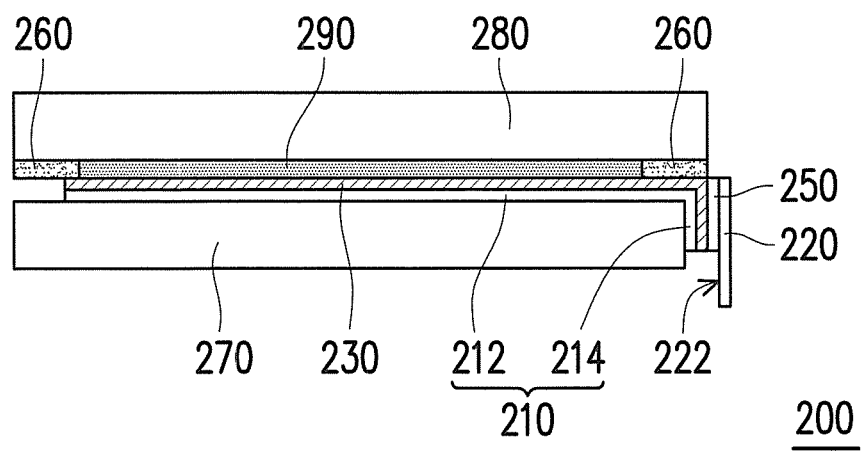

FIG. 5 is a partial exploded diagram of a touch panel according to yet another embodiment of the invention and FIG. 6 is a cross-sectional diagram of the touch panel of FIG. 5. Referring to FIGS. 5 and 6, a touch panel 200 includes a cover plate 280, a flexible transparent film 210, a flexible printed circuit board 220, a sensing device 230 and a shielding layer 260. A display module 270 is disposed under the touch panel 200 (not shown) and is electrically connected to the touch panel 200 via the bonding surface 222. The flexible transparent film 210 includes a base portion 212 and a first folding portion 214 connected to each other. The base portion 212 has a main plane 216, and the main plane 216 has an active region 216a and a non-active region 216b surrounding the active region 216a. The flexible printed circuit board 220 has a bonding surface 222, in which the normal direction N3 of the bonding surface 222 intersects the normal direction N4 of the main plane 216. In another embodiment, the bonding surface 222 and the main plane 216 can be not parallel to each other or not on a same plane.

The sensing device 230 includes a plurality of electrode patterns 232 and a plurality of connecting lines 234. The electrode patterns 232 are located in the active region 216a, the connecting lines 234 are respectively connected between the electrode patterns 232 and the flexible printed circuit board 220 so as to electrically connect the electrode patterns 232 to the flexible printed circuit board 220. At least the partial connecting lines 234 are located in the non-active region 216b. It should be noted that the sensing device 230 of the embodiment is similar to the embodiment of FIG. 1, so as to form a sensing device in electrode string form, which can be referred to the depiction of the aforementioned embodiment. In addition, the sensing device 230 of the embodiment can be a one layer sensor structure, which is omitted to describe.

The cover plate 280 and the display module 270 are respectively located at the two opposite sides of the flexible transparent film 210. The display module 270 provides the touch panel 200 with display function. In the embodiment, the flexible printed circuit board 220 can be optionally connected to the display module 270 so that the sensing device 230 is electrically connected to the display module 270 via the flexible printed circuit board 220. The cover plate 280 is, for example, a glass cover plate or other cover plates with transparent material. In the fabrication process of the touch panel 200, the sensing device 230 is made on the flexible transparent film 210, and then, the flexible transparent film 210 is adhered to the cover plate 280 through an adhesive layer 290 so that the sensing device 230 is located between the cover plate 280 and the flexible transparent film 210. The shielding layer 260 is disposed on the cover plate 280 and in the non-active region 216b to shield the connection lines 234 at the non-active region 216b.

The connecting lines 234 are connected to the flexible printed circuit board 220 at the bonding surface 222, and the bonding region between the flexible printed circuit board 220 and the connection lines 234 is not located on the main plane 216 of the flexible transparent film 210, i.e., the bonding surface 222 of the flexible printed circuit board 220 is not overlapped with and adhered to the main plane 216. Thus, no additional space on the main plane 216 is needed to serve as the bonding region between the connection lines 234 and the flexible printed circuit board 220 so as to further realize the narrow border design.

In the embodiment, the flexible transparent film 210, through folding, makes the first folding portion 214 not parallel to the main plane 216 so as to be connected to the bonding surface 222 of the flexible printed circuit board 220, and the first folding portion 214 of the flexible transparent film 210 is adhered to the bonding surface 222 through the adhesive 250. Since the sensing device 230 is fabricated on the flexible transparent film 210, the connection lines 234 would be folded together with the first folding portion 214 of the flexible transparent film 210 and thus, the first folding portion 214 can be electrically connected to the flexible printed circuit board 220 via the connection lines 234 thereon.

It should be noted that the base portion 212 and the first folding portion 214 in the embodiment are one-body (integrally) formed, and the width of the base portion 212 is the same as the width of the first folding portion 214, so that after the sensing device 230 is made on the flexible transparent film 210, no cutting process is needed, which can reduce the fabrication process cost. On the other hand, the width W1 of a region distributed with the connection lines 234 on the first folding portion 214 is less than the width W2 of the flexible transparent film 210. Since the width W3 of the flexible printed circuit board 220 is roughly equal to or slightly greater than the width W1, the area required by the flexible printed circuit board 220 can be reduced to further save cost. Preferably, the relationship between W1 and W2 is W1<(½)W2. Similar to the embodiment of FIG. 1, the flexible transparent film 210 of the embodiment has good transparency, and thus when the connection lines 234 are made of material with good transparency, the shielding layer 260 of the touch panel 200 can further be saved to realize the no border design.

Figure 7:
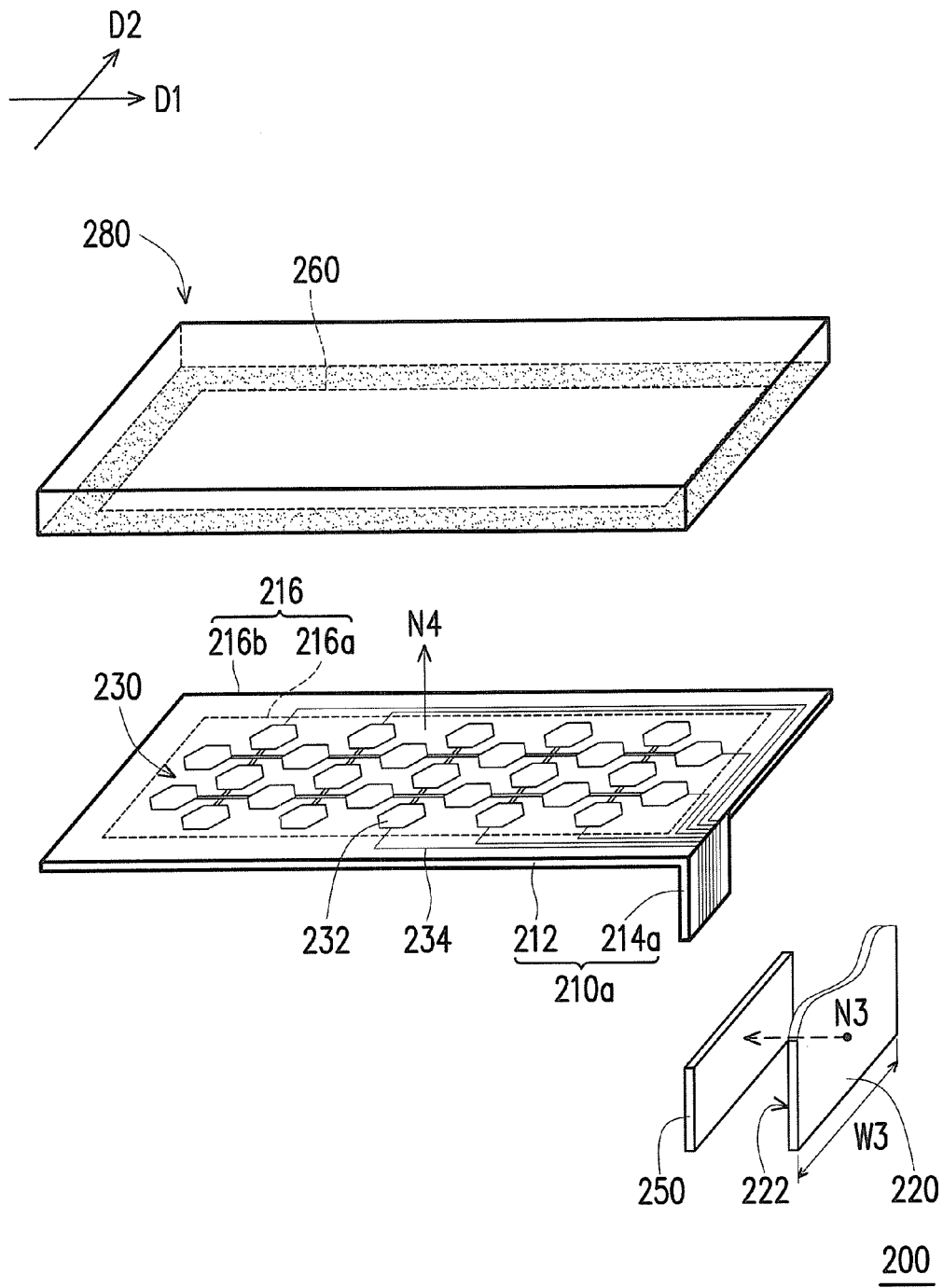
FIG. 7 is a three-dimensional diagram of the flexible transparent film of FIG. 5 according to another embodiment of the invention.
Figure 8:
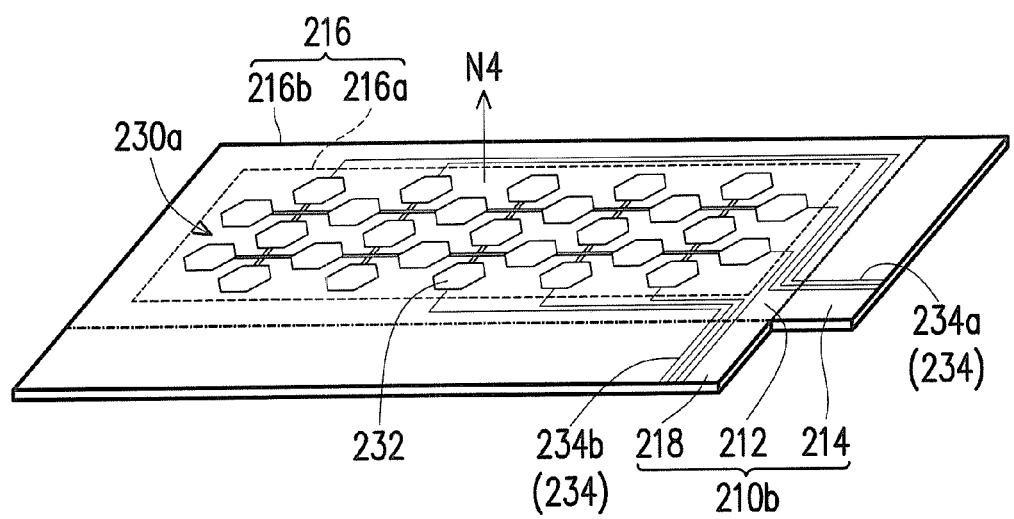
FIG. 8 is a three-dimensional diagram of the flexible transparent film of FIG. 5 according to yet another embodiment of the invention.

The embodiment of FIGS. 7 and 8 adopts partial notations and partial features of the embodiment of FIG. 5, wherein the same notations represent the same or similar parts and the related content is omitted (the omitted depiction can refer to the aforementioned embodiment). FIG. 7 shows a three-dimensional diagram of the flexible transparent film of FIG. 5 according to another embodiment of the invention. The embodiment of FIG. 7 is substantially similar to the embodiment of FIG. 5 except that the width of the base portion 212 of the flexible transparent film 210a is greater than the width of the first folding portion 214a. In the embodiment of FIG. 7, a portion of the first folding portion 214a with no the connection lines 234 of the flexible transparent film 210a is cut off by using a cutting process.

Figure 9:
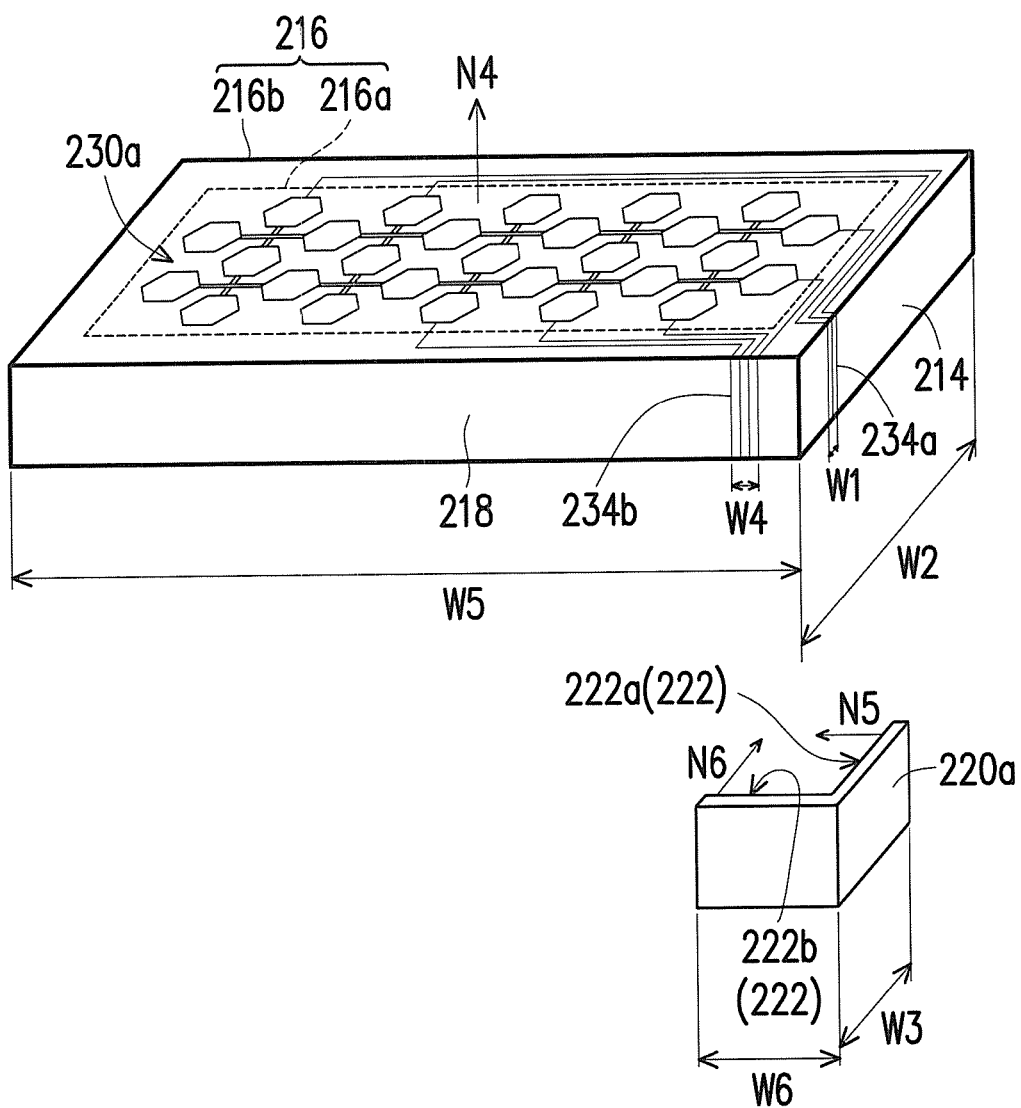
FIG. 9 is a diagram showing a flexible printed circuit board and the flexible transparent film of FIG. 8.

FIG. 8 shows a three-dimensional diagram of the flexible transparent film of FIG. 5 according to yet another embodiment of the invention and FIG. 9 shows a three-dimensional diagram of the flexible printed circuit board and the flexible transparent film of FIG. 8. FIG. 8 shows the non-folding state of the flexible transparent film 210b and FIG. 9 shows the state of the flexible transparent film 210b after folding and a flexible printed circuit board 220a which the flexible transparent film 210b is to connect. Referring to FIGS. 8 and 9, the flexible transparent film 210b of the embodiment is substantially similar to the embodiment of FIG. 5 except that the flexible transparent film 210b further includes a second folding portion 218. The first folding portion 214 and the second folding portion 218 are connected to different sides of the base portion 212 of the flexible transparent film 210b. It can be seen from FIG. 9, the flexible transparent film 210b, through folding, makes the first folding portion 214 and the second folding portion 218 not parallel to the main plane 216 so as to be connected to the flexible printed circuit board 220a.

In the embodiment, a portion of the electrode patterns 232 is electrically connected to the flexible printed circuit board 220a via a portion 234a of the connection lines extending to the first folding portion 214, while the other portion of the electrode patterns 232 is electrically connected to the flexible printed circuit board 220a via the portion 234b of the connection lines extending to the second folding portion 218. In the embodiment, both the sensing device 230a and the connection lines 234 are fabricated on the flexible transparent film 210b, so that the connection lines 234a and 234b are, along with the first folding portion 214 and the second folding portion 218 of the flexible transparent film 210b, folded. At the time, the first folding portion 214 and the second folding portion 218 can achieve the electrical connection between the flexible printed circuit board 220a and the connection lines 234a and 234b.

In the embodiment, the bonding surface 222 of the flexible printed circuit board 220a includes a first bonding surface 222a and a second bonding surface 222b. Both the normal direction N5 of the first bonding surface 222a and the normal direction N6 of the second bonding surface 222b intersect the normal direction N4 of the main plane 216, and the normal direction N5 of the first bonding surface 222a intersects the normal direction N6 of the second bonding surface 222b. The connection lines 234a on the first folding portion 214 are connected to the flexible printed circuit board 220a at the first bonding surface 222a, and the connection lines 234b on the second folding portion 218 are connected to the flexible printed circuit board 220a at the second bonding surface 222b. Thus, the sensing device 230a can be connected to the flexible printed circuit board 220a respectively on two different bonding surfaces. In the embodiment, the first folding portion 214 and the second folding portion 218 are connected to two adjacent sides of the base portion 212. In other embodiments however, the first folding portion 214 and the second folding portion 218 can be connected to two opposite sides of the base portion 212.

In the embodiment, the base portion 212, the first folding portion 214 and the second folding portion 218 are one-body formed, so that the width of the base portion 212 can be the same as the width of the first folding portion 214, and the length of the base portion 212 can be the same as the length of the second folding portion 218 as well. Alternately, the width of the base portion 212 is greater than the width of the first folding portion 214, and the length of the base portion 212 is greater than the width of the second folding portion 218. In addition, when the first folding portion 214 and the second folding portion 218 are connected to two opposite sides of the base portion 212, the width of the first folding portion 214 and the width of the second folding portion 218 are configured to be the same as the width of the base portion 212. The one-body form herein can refer to the aforementioned embodiment, which is omitted to describe. In the same way, the width W1 of the region distributed with the connection lines 234a on the first folding portion 214 is less than the width W2 of the base portion 212. Since the width W3 of the first bonding surface 222a of the flexible printed circuit board 220a is roughly equal to or slightly greater than the width W1, the area, required by the flexible printed circuit board 220a can be reduced to further save cost. In addition, the width W4 of the region distributed with the connection lines 234b on the second folding portion 218 is less than the length W5 of the base portion 212, and the width W6 of the second bonding surface 222b of the flexible printed circuit board 220a is roughly equal to or slightly greater than the width W4, such that the area of the flexible printed circuit board 222b can be reduced to further save cost. Preferably, the relationship between W1 and W2 is W1<(½)W2 and the relationship between W4 and W5 is W4<(½)W5.

Figure 10:
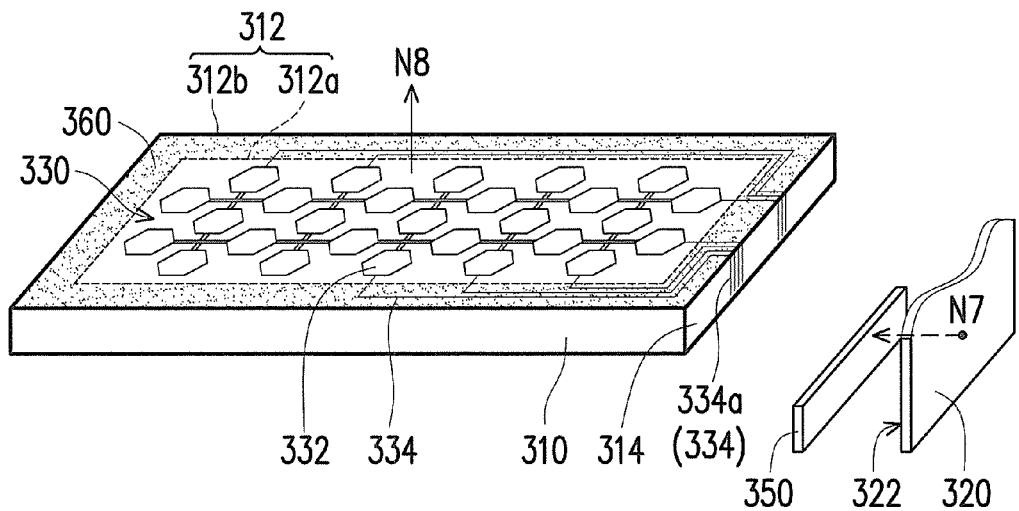
FIG. 10 is a partial exploded diagram of a touch panel according to yet another embodiment of the invention.
Figure 11:
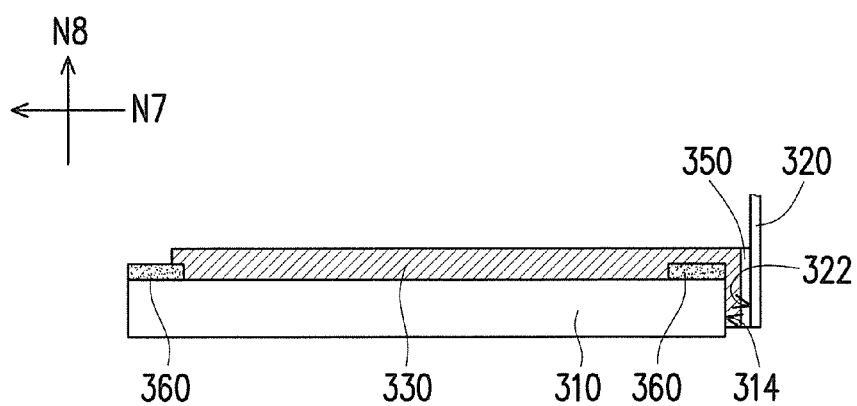
FIG. 11 is a cross-sectional diagram of the touch panel of FIG. 10.

FIG. 10 is a partial exploded diagram of a touch panel according to yet another embodiment of the invention and FIG. 11 is a cross-sectional diagram of the touch panel of FIG. 10. Referring to FIGS. 10 and 11, the touch panel 300 includes a substrate 310, a flexible printed circuit board 320, a sensing device 330 and a shielding layer 360. The substrate 310 is, for example, a glass substrate or other substrates with transparent material. The substrate 310 includes a main plane 312, and the main plane 312 has an active region 312a and a non-active region 312b surrounding the active region 312a. The flexible printed circuit board 320 has a bonding surface 322, in which the normal direction N7 of the bonding surface 322 intersects the normal direction N8 of the main plane 312.

The sensing device 330 includes a plurality of electrode patterns 332 and a plurality of connecting lines 334. The electrode patterns 332 are located in the active region 312a, the connecting lines 334 are respectively connected between the electrode patterns 332 and the flexible printed circuit board 320 so as to electrical connect the electrode patterns 332 to the flexible printed circuit board 320, and at least partial connecting lines 334 are located in the non-active region 312b. It should be noted that the sensing device 330 of the embodiment is similar to the embodiment of FIG. 1, i.e., the sensing device 330 is in the form of electrode string, referring to the aforementioned embodiment which is omitted to describe. The shielding layer 360 is disposed on the substrate 310 and disposed at the non-active region 312b to shield the connecting lines 334 located at the non-active region 312b. In other embodiments, however, the shielding layer 360 of the touch panel 100 can be saved. The touch panel 300 can be combined with a display module (not shown). The combining way of the touch panel 300 and the display module can refer to the aforementioned embodiment which is omitted to describe.

The connecting lines 334 are connected to the flexible printed circuit board 320 at the bonding surface 322, and the normal direction N7 of the bonding surface 322 intersects the normal direction N8 of the main plane 312 so that the bonding region of the flexible printed circuit board 320 bonded to the connecting lines 334 is not located on the main plane 312 of the flexible transparent film, which can reduce the border dimension of the touch panel 300 of the flexible transparent film. Moreover, the substrate 310 in the embodiment has a side surface 314 connected to the main plane 312 and parallel to the bonding surface 322. The flexible printed circuit board 320 is adhered to the side surface 314 through, for example, an adhesive 350. The connecting lines 334 extend from the non-active region 312b onto the side surface 314, i.e., the bonding surface 322 and the side surface 314 of the substrate are partially overlapped with each other so as to achieve the electrical connection between the electrode patterns 332 and the flexible printed circuit board 320.

In the aforementioned embodiment, the bending property of the flexible transparent film makes the folded flexible transparent film connect the intersected main plane and the bonding surface. In the embodiment, a portion 334a of the connecting lines 334 is made on the side surface 314 intersecting the main plane 312 and the bonding surface 322 of the flexible printed circuit board 320 is adhered to the side surface 314. Thus, by means of the continuously extending connecting lines 334, the electrode patterns 332 on the main plane 312 are electrically connected to of the flexible printed circuit board 320 at the bonding surface 322, which can save an additional flexible transparent film in FIG. 1 and has an advantage of saving cost. In addition, in the embodiment, the connecting lines 334 extend from the active region 312a to the non-active region 312b, then from the non-active region 312b to one side surface 314 of the substrate 310. In an alternative embodiment, the connecting lines 334 can extend from the non-active region 312b to multiple side surfaces of the substrate 310

It should be noted that in the embodiment the bonding surface 322 is adhered at the side surface 314 of the substrate 310 to make the bonding surface 322 and the side surface 314 located at the same side of the main plane 312. In the aforementioned embodiment, however, the bonding surface 322 and the side surface 314 can be located at the two opposite side of the main plane. In the aforementioned embodiment, once changing the folding direction of the flexible transparent film, the bonding surface and the side surface can be located at the same side of the main plane. That is, in terms of the embodiment bonding the flexible transparent film to the flexible printed circuit board, the folding direction of the flexible transparent film is not specifically limited.

If the substrate 310 and the connecting lines 334 of the embodiment are made of material with good transparency, the shielding layer 360 can be saved so that the touch panel 300 achieves the design of no border, which is similar to the aforementioned embodiment and omitted to describe.

Figure 12:
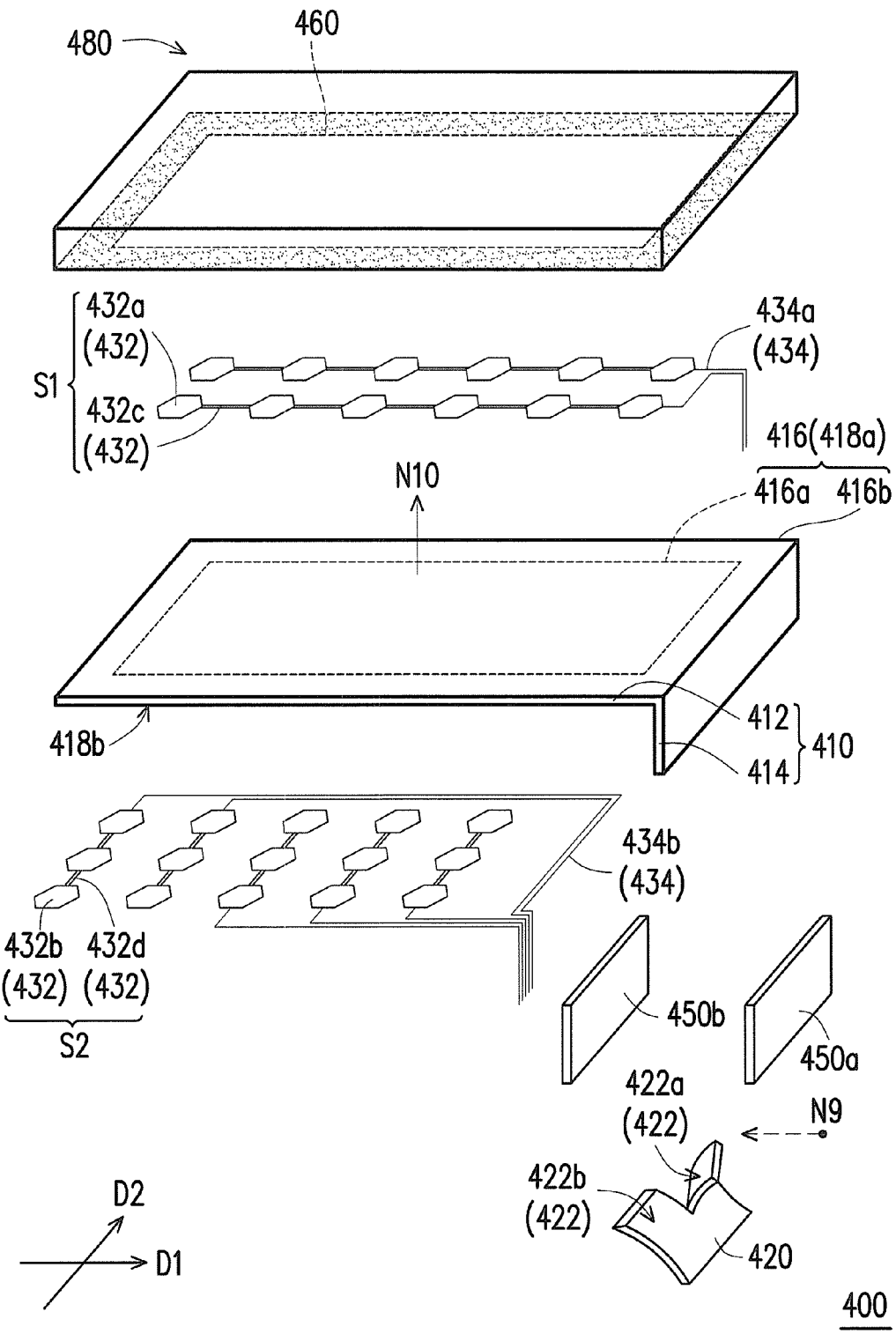
FIG. 12 is a partial exploded diagram of a touch panel according to yet another embodiment of the invention.
Figure 13:
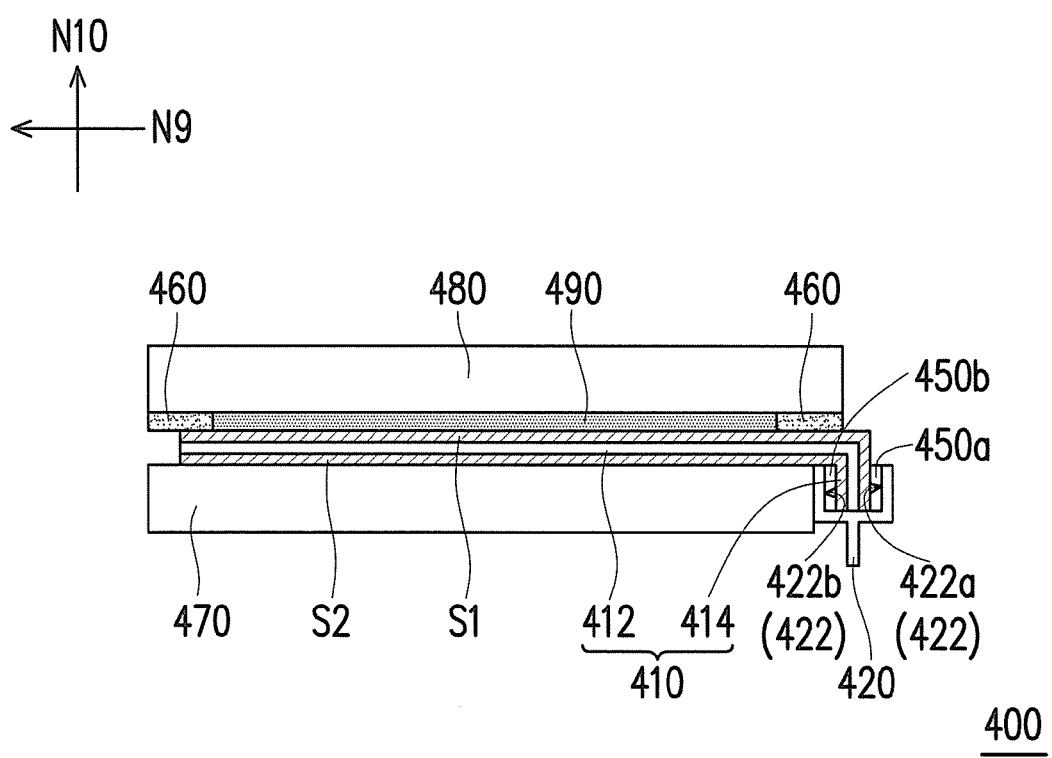
FIG. 13 is a cross-sectional diagram of the touch panel of FIG. 12.

FIG. 12 is a partial exploded diagram of a touch panel according to yet another embodiment of the invention and FIG. 13 is a cross-sectional diagram of the touch panel of FIG. 12. Referring to FIGS. 12 and 13, the touch panel 400 includes a flexible transparent film 410, a flexible printed circuit board 420, a sensing device 430, a cover plate 480 and a shielding layer 460. In the embodiment, the cover plate 480 is, for example, a glass cover plate or other cover plates with transparent material. In the fabrication process of the touch panel 400, the sensing device 430 is made on the flexible transparent film 410, and the flexible transparent film 410 is adhered to the cover plate 480 through an adhesive layer 490. The flexible transparent film 410 includes a base portion 412 and a folding portion 414 connected to each other. The base portion 412 has a main plane 416, and the main plane 416 has an active region 416a and a non-active region 416b surrounding the active region 416a. The flexible printed circuit board 420 has a bonding surface 422, in which the normal direction N9 of the bonding surface 422 intersects the normal direction N10 of the main plane 416, or the bonding surface 422 is not parallel to the main plane 416. In the embodiment, the touch panel 400 can be optionally disposed on a display module 470 to have display function and make the flexible printed circuit board 420 electrically connected to the display module 470, which can refer to the aforementioned embodiment and it is omitted to describe.

The sensing device 430 includes a plurality of electrode patterns 432 and a plurality of connecting lines 434. The electrode patterns 432 are located in the active region 416a, the connecting lines 434 are respectively connected between the electrode patterns 432 and the flexible printed circuit board 420 so as to be electrically connected to the electrode patterns 432 and the flexible printed circuit board 420, and at least partial connecting lines 434 are located in the non-active region 416b. The shielding layer 460 is disposed on the cover plate 480 and disposed at the non-active region 416b to shield the connecting lines 434 located at the non-active region 416b.

The sensing device 430 of the embodiment is in form of electrode string, but its layout is different from the embodiment of FIG. 1. The electrode patterns 432 herein includes a plurality of first electrode portions 432a, a plurality of second electrode portions 432b, a plurality of first connection portions 432c and a plurality of second connection portions 432d. The first connection portions 432c are connected to the first electrode portions 432a along a first direction D1 to form a plurality of first electrode strings S1 and the second connection portions 432d are connected to the second electrode portions 432b along a second direction D2 to form a plurality of second electrode strings S2. The connecting lines 434 include a plurality of first connecting lines 434a connected to the first electrode strings S1 and a plurality of second connecting lines 434b connected to the second electrode strings S2. In the embodiment, the flexible transparent film 410 has a first surface 418a and a second surface 418b opposite to each other, wherein the first electrode strings S1 and the first connecting lines 434a are disposed on the first surface 418a and the second electrode strings S2 and the second connecting lines 434b are disposed on the second surface 418b.

It should be noted that in the embodiment the first surface 418a is substantially the same as the main plane 416, and the first electrode strings 51 and the first connecting lines 434a are disposed on the main plane 416. In addition, the aforementioned embodiment makes the first electrode strings, the second electrode strings, the first connecting lines and the second connecting lines disposed on a same surface of the flexible transparent film or the glass substrate, while the embodiment makes the first electrode strings S1 and the second electrode strings S2 fabricated on two opposite surfaces of the flexible transparent film 410.

In the embodiment, the bonding surface 422 of the flexible printed circuit board 420 includes a first bonding surface 422a and a second bonding surface 422b. The second bonding surface 422b is roughly parallel to the first bonding surface 422a. The folding portion 414 of the flexible transparent film 410 is located between the first bonding surface 422a and the second bonding surface 422b to make the first electrode strings S1 and the second electrode strings S2 electrically connected to the flexible printed circuit board 420 respectively through the first connecting lines 434a located on the first surface 418a and the second connecting lines 434b on the second surface 418b. By using the bending property of the flexible transparent film 410, the embodiment enables the first connecting lines 434a and the second connecting lines 434b at the two sides of the folding portion 414 folded along with the flexible transparent film 410. Thus, the folding portion 414 has conductive feature on double surface thereof. The folding portion 414 is adhered to the first bonding surface 422a and the second bonding surface 422b respectively through adhesives 450a and 450b and is electrically connected to the flexible printed circuit board 420 via the first connecting lines 434a and the second connecting lines 434b.

In summary, in the touch panel of the invention, the connection lines of the sensing device are bonded to the bonding surface of the flexible printed circuit board, in which the normal direction of the bonding surface intersects the normal direction of the main plane or the bonding surface and the main plane are not parallel to each other, i.e., the bonding surface is not overlapped with and adhered to the main plane, which makes the bonding region of the sensing device and the flexible printed circuit board not located on the main plane. In this way, the invention can reduce the range of the shielding layer so as to effectively reduce the border dimension and achieve a narrow border effect.

In order to bond the connecting lines to the bonding surface of the flexible printed circuit board, it uses the bonding feature of the flexible transparent film or directly makes a portion of the connecting lines extend to the side surface of the substrate, followed by adhering the bonding surface to the side surface. When the flexible transparent film is adopted, the entire sensing device can be made on the flexible transparent film to make the connecting lines folded as well, or a portion of the connecting lines is made on the flexible transparent film, followed by connecting the flexible transparent film with a portion of the connecting lines the other portion of the connecting lines. In short, the invention can use different implementations to bond the connecting lines onto the bonding surface.

The flexible transparent film has good transparency, when the connecting lines are made of material with good transparency, the shielding layer can be saved to make the touch panel with zero border. Similarly, in the example where the connecting lines directly extend to the side surface of the substrate, when the substrate and the connecting lines are made of material with good transparency, the shielding layer can be saved to make the touch panel with no border.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A touch panel, comprising:
a substrate, comprising:
a main plane, having an active region and a non-active region surrounding the active region, wherein the substrate is a flexible transparent film, the flexible transparent film comprises a base portion and a first folding portion, the base portion has the main plane;
a flexible printed circuit board, having a bonding surface, wherein the bonding surface and the main plane are not parallel to each other, and the first folding portion is not parallel to the main plane but connected to the bonding surface through folding the flexible transparent film; and
a sensing device, comprising:
a plurality of electrode patterns, located in the active region; and
a plurality of connecting lines, respectively connected between the electrode patterns and the flexible printed circuit board so as to electrically connect the electrode patterns and the flexible printed circuit board, wherein at least a part of the connecting lines is located in the non-active region, the connecting lines are connected to the bonding surface of the flexible printed circuit board, and the connection lines extend to the first folding portion so as to be electrically connected to the flexible printed circuit board.

2. The touch panel as claimed in claim 1, wherein the base portion and the first folding portion are integrally formed, and a width of the base portion is the same as a width of the first folding portion.

3. The touch panel as claimed in claim 2, wherein a width W1 of an area distributed with the connection lines on the first folding portion is less than a width W2 of the base portion.

4. The touch panel as claimed in claim 2, wherein a relationship between the width W1 of the area distributed with the connection lines on the first folding portion and the width W2 of the base portion is $W1<(\frac{1}{2})W2$.

5. The touch panel as claimed in claim 1, wherein the width of the base portion is greater than the width of the first folding portion.

6. The touch panel as claimed in claim 1, wherein the flexible transparent film further comprises a second folding portion, the first folding portion and the second folding portion are connected to different sides of the base portion, both the first folding portion and the second folding portion not parallel to the main plane through folding the flexible transparent film so as to be connected to the flexible printed circuit board, wherein a portion of the electrode patterns is electrically connected to the flexible printed circuit board via a portion of the connection lines extending to the first folding portion, and the other portion of the electrode patterns is electrically connected to the flexible printed circuit board via another portion of the connection lines extending to the second folding portion.

7. The touch panel as claimed in claim 6, wherein the bonding surface of the flexible printed circuit board comprises a first bonding surface and a second bonding surface, both normal directions of the first bonding surface and the second bonding surface intersect the normal direction of the main plane.

8. The touch panel as claimed in claim 6, wherein the width of the base portion is the same as the width of the first folding portion, and the length of the base portion is the same as the width of the second folding portion.

9. The touch panel as claimed in claim 8, wherein the width of the base portion is greater than the width of the first folding portion, and the length of the base portion is greater than the width of the second folding portion.

10. The touch panel as claimed in claim 8, wherein the width W1 of the area distributed with the partial connection lines extending to the first folding portion is less than the width W2 of the base portion, and a width W4 of and area distributed with the partial connection lines extending to the second folding portion is less than a length W5 of the base portion.

11. The touch panel as claimed in claim 8, wherein a relationship between the width W1 of the area distributed with the partial connection lines extending to the first folding portion and the width W2 of the base portion is W1<(½) W2, and a relationship between the width W4 of an area distributed with the partial connection lines extending to the second folding portion and the length W5 of the base portion is W4<(½)W5.

12. The touch panel as claimed in claim 1, wherein the electrode patterns comprise a plurality of first electrode portions, a plurality of second electrode portions, a plurality of first connection portions and a plurality of second connection portions, wherein the first connection portions are connected to the first electrode portions along a first direction to form a plurality of first electrode strings, the second connection portions are connected to the second electrode portions along a second direction to form a plurality of second electrode strings, the first direction intersects the second direction, and the connection lines comprise a plurality of first connection lines connected to the first electrode strings and a plurality of second connection lines connected to the second electrode strings.

13. The touch panel as claimed in claim 1, wherein the sensing device is an one-layer electrode structure.

14. The touch panel as claimed in claim 1, wherein the normal direction of the bonding surface intersects the normal direction of the main plane.

* * * * *